United States Patent
De Bruijn et al.

(10) Patent No.: US 9,379,814 B2
(45) Date of Patent: Jun. 28, 2016

(54) LIGHT DETECTION SYSTEM AND METHOD

(75) Inventors: Frits De Bruijn, Eindhoven (NL); Ruud Vlutters, Eindhoven (NL); Lorenzo Feri, Eindhoven (NL); Tim Schenk, Eindhoven (NL); Ronald Rietman, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 289 days.

(21) Appl. No.: 14/004,773

(22) PCT Filed: Mar. 22, 2012

(86) PCT No.: PCT/IB2012/051370
§ 371 (c)(1),
(2), (4) Date: Oct. 2, 2013

(87) PCT Pub. No.: WO2012/127439
PCT Pub. Date: Sep. 27, 2012

(65) Prior Publication Data
US 2014/0314420 A1 Oct. 23, 2014

(30) Foreign Application Priority Data
Mar. 22, 2011 (EP) .................................. 11159149

(51) Int. Cl.
*H04B 10/116* (2013.01)
*H04B 10/54* (2013.01)
(Continued)

(52) U.S. Cl.
CPC .............. *H04B 10/116* (2013.01); *H04B 10/54* (2013.01); *H04B 10/548* (2013.01); *H04B 10/69* (2013.01);
(Continued)

(58) Field of Classification Search
CPC ............ H04N 5/23254; H04N 5/3532; H04N 5/23212; H04N 5/2353; H04B 10/116
See application file for complete search history.

(56) References Cited

U.S. PATENT DOCUMENTS

2008/0024633 A1  1/2008  Hofer
2008/0259354 A1*  10/2008  Gharib ............... G01B 11/2509
                                                    356/601
(Continued)

FOREIGN PATENT DOCUMENTS

NL   WO 2009010926 A2 *  1/2009  ......... H05B 37/0272
WO       2006111930 A2    10/2006
(Continued)

OTHER PUBLICATIONS

Jean-Paul M. G. Linnartz et al; "Code Division-Based Sensing of Illumination Contributions in Solid-State Lighting Systems" Proceedings of the Intnl Conf on Comunications, Beijing, China May 2009, pp. 1-16.
(Continued)

*Primary Examiner* — Ahmed A Berhan
(74) *Attorney, Agent, or Firm* — Meenakshy Chakravorty

(57) ABSTRACT

There is provided a light detection system which is capable of determining in light embedded codes by detecting light in a scene which is illuminated by an illumination system (110) comprising one or more light sources (111,112,113) each providing a light contribution ($I_{111}$, $I_{112}$, $I_{113}$) comprising an embedded code (ID#1, ID#2, ID#3) emitted as a temporal sequence of modulations in a characteristics of the light emitted. The light detection system comprises light detection means (220), which are arranged for acquiring at least one image of the scene, where the image is acquired a plurality of temporal shifted line instances. Each line of the acquired image comprises an instance of the temporal sequence of modulations of the first embedded code. The light detection system further comprises means (230) for determining embedded codes from the spatial pattern of modulations.

10 Claims, 8 Drawing Sheets

(51) Int. Cl.
  *H04N 5/225*  (2006.01)
  *H05B 37/02*  (2006.01)
  *H04B 10/548*  (2013.01)
  *H04B 10/69*  (2013.01)
  *H04N 5/353*  (2011.01)

(52) U.S. Cl.
  CPC ............ *H04N 5/225* (2013.01); *H04N 5/3532* (2013.01); *H05B 37/02* (2013.01); *H05B 37/029* (2013.01); *H05B 37/0272* (2013.01)

(56) References Cited

U.S. PATENT DOCUMENTS

2009/0084847 A1* 4/2009 He .................... G06K 7/10722
                                                    235/455
2009/0284366 A1   11/2009 Haartsen et al.

FOREIGN PATENT DOCUMENTS

| WO | 2007125477 A2 | 11/2007 |
| WO | 2009010926 A2 | 1/2009 |
| WO | 2009040718 A2 | 4/2009 |
| WO | 2009093161 A1 | 7/2009 |
| WO | 2009136309 A2 | 11/2009 |
| WO | 2009136312 A1 | 11/2009 |
| WO | 2011086501 A1 | 7/2011 |
| WO | 2011086517 A1 | 7/2011 |

OTHER PUBLICATIONS

L Schenker; "Pushbutton Calling With a Two-Group Voice-Frequencey Code", The Bell System Technical Journal, vol. 39, No. 1, pp. 235-255, Jan. 1960.

* cited by examiner

LIGHT DETECTION SYSTEM AND METHOD

FIELD OF THE INVENTION

The present invention relates generally to the field of illumination light detection systems, and more particularly to a system and method for detecting data embedded into the light output of such illumination systems.

BACKGROUND OF THE INVENTION

In recent years, highly advanced illumination systems are being developed to allow a user to obtain a desired ambiance for a particular room or space. In these illumination systems so called scene setting is employed, where one or more sets of light sources are controlled simultaneously, contrary to traditional control of individual light sources with respect to e.g. switching on/off, dimming, and color setting. For these scene setting applications, intuitive user interaction is an important success factor. Providing a user with information related to the light sources, like localized identification of the individual light sources, their capacities, and their current setting, is key for enabling an intuitive interaction.

To provide such information to the user, techniques based on coded light, CL, have been proposed. CL is based on embedding data into the light output of the light sources. The light output of a light source is typically modulated in response to a repeating data signal, which may contain identifier codes, e.g. identifying codes for identifying the light source or a group of light sources to which the light source belongs. The modulation typically occurs at a frequency that is sufficiently high to be imperceptible by humans. Simultaneous detection of light contributions from multiple light sources is possible by modulating each light source in a unique fashion. There exist various methods, continuous and binary, allowing both synchronous and asynchronous detection of a (theoretically) unlimited number of light sources.

It has been previously shown how CL technology can be used for commissioning of lighting systems, e.g. by pointing to the individual light sources and reading out the identifier codes.

The embedded data, e.g. identifier codes, in the light output of the light sources may be detected by an optical receiver which may, be implemented in e.g. a remote control for controlling the lamp or included in another unit such as a switch or a sensor device. This has a drawback that only embedded data present at single positions can be detected. In contrast it is desirable to characterize the whole two dimensional (2D) scene in real time in terms of identifier codes being present, and distinguishing the identifier codes of the different light sources in the light scene.

Camera sensors have been proposed that can determine embedded data present at multiple positions within an image of a scene. However, a drawback of the previous techniques employing camera sensors is that the time between subsequent image acquisitions must generally be equal to, or shorter than, the duration of a single bit within the embedded code. Consecutive bits of the embedded code are then detected by analyzing results obtained in consecutive acquisitions of the camera. This requires the use of advanced and therefore expensive cameras capable of providing a high acquisition rate. Conventional low-cost camera sensors typically have too low of an acquisition rate to be useful for detecting embedded data being invisible to the human eye, i.e. high frequency CL.

Thus, there is a need in the art for a technique for detecting CL embedded into a light output of light sources that addresses at least some of the above mentioned problems.

SUMMARY OF THE INVENTION

It is an object of the present invention to overcome the above mentioned problems, and to provide a light detection system and a method capable of detecting 2D CL embedded into a light output of light sources in a manner that allows identification of the embedded codes of the different light sources being present in a 2D scene. It is a further object of the invention to provide a detection system and method suitable for detecting high frequency CL while using less expensive cameras as those used in previous techniques.

This object is achieved by a light detection system according to the present invention as defined in the appended claims. Preferred embodiments are set forth in the dependent claims and in the following description and drawings.

Thus, in accordance with the present inventive concept, there is provided a light detection system comprising light detection means arranged for acquiring at least one image of a scene, which is illuminated by an illumination system comprising at least a first light source providing a light contribution comprising a first embedded code emitted as a temporal sequence of modulations in a characteristics of the light emitted. The image comprises a matrix of pixels, each pixel representing an intensity of a total light output of the illumination system at a different physical position within the scene. The image is acquired by a plurality of temporal shifted line instances, each comprising an instance of the temporal sequence of modulations of the first embedded code. The light detection system further comprises processing means arranged for determining the first embedded code from the spatial pattern of modulations.

Thus, there is provided a light detection system which captures light outputted from a scene in a 2D image, and wherein temporal shifted line instances serve as light sample moments. The temporal shift between the capture of consecutive rows on the light detection means during the image capture process gives rise to a line-wise variation in pixel values for those areas in the final captured image of the scene that correspond to parts of the objects that are illuminated with said modulated light source or to the light source itself. The line-wise variation in pixel values constitute a pattern of horizontal lines superimposed on top of the image at illuminated objects. The decoding of the message, i.e. the embedded code, in the encoded light requires the recovery of a 1-dimensional (1D) signal that is associated with the original intensity variations of the modulated light source.

By utilizing image acquisition based on acquiring the image line by line, and as the line frequency of an image tends to be an order $10^2$ to $10^3$ higher than a corresponding video frame rate, the temporal sample rate of the modulated light is increased by that same order. Thereby a light detection system is provided which provides a significantly shortened measurement time by measuring multiple channel bits within one single frame time. The system may be based on a rolling-shutter image capture, that is, the light detection means comprises an image sensor and a rolling-shutter means. This is typical to the low-cost image sensors currently used in mobile devices, which thus provides a low cost solution for the detection system. Further, the use of rolling-shutter image capture allows for transforming current smart-phones into coded-light detectors which opens up a world of applications utilizing information provided in e.g. the coded light present in illumination of public or private areas. The additional wireless connectivity of current phones (Wi-Fi, Bluetooth) provides various opportunities for feedback of control signals. In addition to detecting the data encoded in the light, the image sensor continues to provide spatial information with regard to the separate light contributions to the observed scene.

According to an embodiment of the light detection system, the processing means is configured for determining the first embedded code based on a combination of pixel values along each line instance. Thus, the recovery of the 1D signal from the (2D) image is based on the combination of pixel values along each row of the acquired image. The combination of pixel values may be an accumulative summation or an averaging of pixel values along each row, i.e. along each line instance.

According to an embodiment of the light detection system, the combination of pixel values along line instances is constrained to at least one predetermined subarea of the acquired image. By constraining the row-wise pixel-value combination to predetermined subareas being for instance those regions in the image that correspond to the illuminated objects in the scene, the signal-to-noise ratio (SNR) of the recovered signal can be improved. The selection of these relevant image regions may be performed in several ways, the simplest of which is the selection of brightest area in the image. The decoding of the message from the recovered 1D signal may be done utilizing methods used in electrical computer networks.

According to an embodiment of the light detection system, a selection of the predetermined subarea is performed by convolving the image with a filter having a filter kernel, which filter kernel is arranged to match an expected spatial pattern of modulations associated with said first embedded code. The filter may be a 1D or 2D filter, and is thus arranged such that the filter kernel matches an expected intensity pattern that is associated with a characteristic of the light-modulating signal.

According to an embodiment of the light detection system, the light detection means comprises an image sensor comprising a pixel matrix of which complementary groups of pixels are read out at different time instances. This is advantageous since there is no need to read out complementary pixel groups being whole rows or columns, but merely a selected number of pixels need to be read out which provides a fast readout. Code recovery from the modulated light may advantageously be done when knowing the temporal order of the pixel groups. Note that each pixel group does not have to be composed of adjacent pixels.

According to an embodiment of the light detection system, each complementary group of pixels constitutes a row of pixels of the pixel matrix of the image sensor. In this case, when performing subsequently readouts of pixel rows of the sensor, the temporal order of the readouts does not necessarily have to correspond to the spatial order of the pixel rows, which is advantageous.

According to an embodiment of the light detection system, the light detection means comprises an image sensor comprising a pixel matrix, and the line instances correspond to subsequent row readouts from the pixel matrix.

According to an embodiment of the light detection system, the readout at different time instances of rows of pixels occur in a spatially monotonic order such that adjacent time instances correspond to spatially adjacent rows of pixels. In this case, e.g. when each line instance corresponds to a row readout of the pixel matrix of the image sensor, a normal rolling shutter readout is obtained.

According to an embodiment of the light detection system, it is arranged for detecting and analyzing an acquired image comprising contributions from a plurality of light sources, wherein each light contribution of a respective light source comprises an embedded unique code emitted as temporal sequences of modulations in a characteristics of the light emitted.

According to an embodiment of the light detection system, it further comprises an optical system for providing defocusing of the acquired image.

According to an embodiment of the light detection system, the optical system comprises an aperture mask element for providing a pattern in the defocused acquired image.

According to an embodiment of the light detection system, a spatial shape of the aperture mask element is selected for spatially separating light contributions originating from different light sources.

According to an embodiment of the light detection system, for a selected time delay between line readouts of the temporal shifted line instances, an exposure time of the light detection means is selected to be longer than the selected time delay between line readouts.

According to an embodiment of the light detection system, for a selected time delay between line readouts of the temporal shifted line instances, an exposure time of the light detection means is selected to be equal to the selected time delay between line readouts.

According to an embodiment of the light detection system, for a selected time delay between line readouts of the temporal shifted line instances, an exposure time of the light detection means is selected to be shorter than the selected time delay between line readouts.

According to an embodiment of the light detection system, the light detection means is a rolling-shutter camera.

According to an embodiment of the light detection system, the embedded code is transmitted in a repetitive fashion, being one of a continuous repetitive data-stream, a packetized data stream, with packets at regular intervals, and a packetized data stream, with packets at irregular intervals.

According to an embodiment of the light detection system, the characteristics of the light emitted is one of an intensity modulation and a color modulation.

According to another aspect of the inventive concept there is provided a method for determining whether a light contribution of a first light source in an illumination system is present at a selected position within a scene, wherein the light contribution of the first light source comprises a first embedded code emitted as a temporal sequence of modulations in a characteristics of the light emitted, the method comprising: retrieving temporal shifted line instances of the light contribution, and determining the first embedded code from the spatial pattern of modulations.

As used herein, the term "pixel" refers to a unit of the image data corresponding to a particular point within a scene. Image data comprises intensities (or derivatives thereof) of the total light output of the illumination system at different points within the scene. Arranging image data in rows and columns of pixels is one way of representing the three-dimensional (3D) scene in a 2D image.

These and other aspects, features, and advantages of the invention will be apparent from and elucidated with reference to the embodiments described hereinafter. It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

The present invention will now be described more fully hereinafter with reference to the accompanying drawings. The below embodiments are provided by way of example so that this disclosure will be thorough and complete, and will fully convey the scope of the invention to those skilled in the art. Like numbers refer to like elements throughout.

Figure 1:
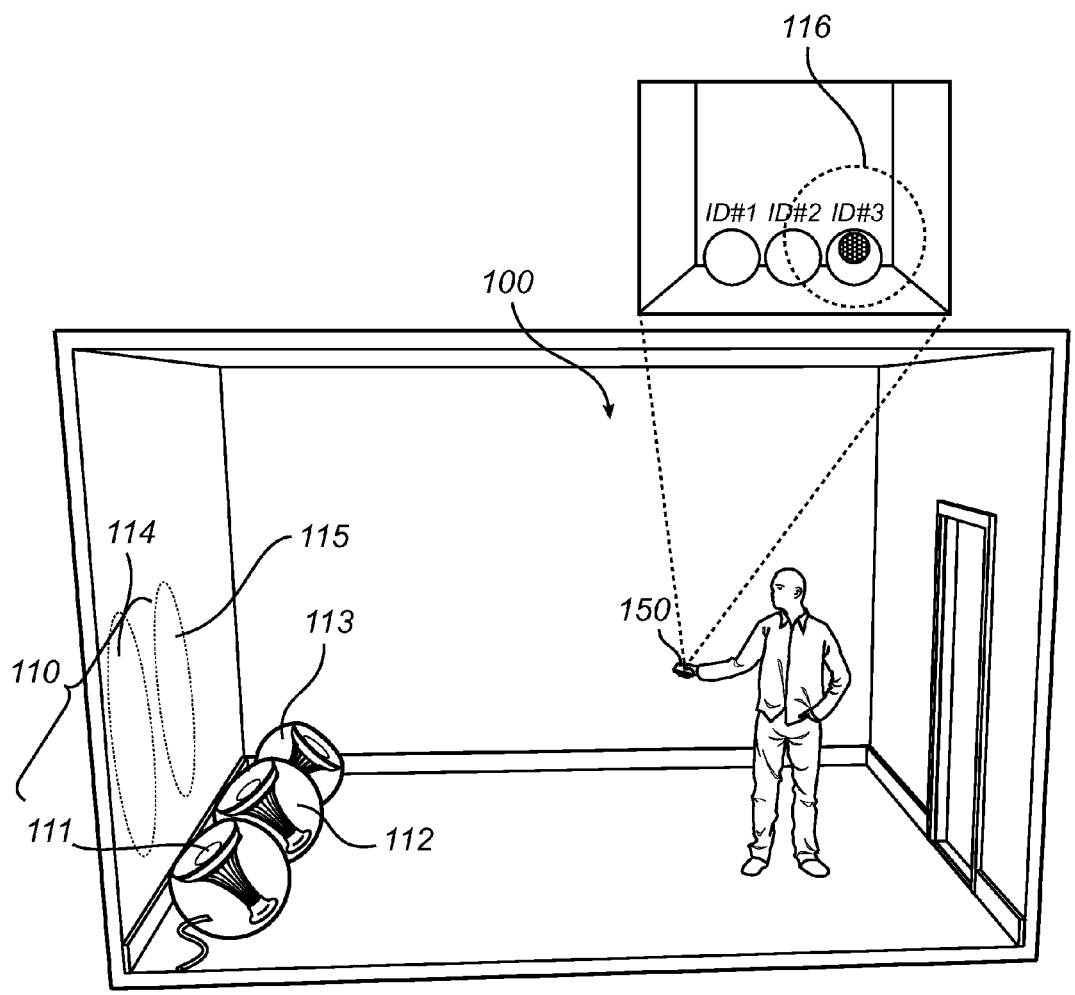
FIG. 1 is a schematic illustration of an illumination system in which an embodiment of a light detection system according to the present inventive concept is employed.

FIG. 1 illustrates a structure 100, here being a room, in which an illumination system 110 is installed. The illumination system 110 comprises three light sources 111, 112, and 113, and one or more control units for controlling the light sources 111, 112, 113. The illumination system here comprises a remote control 150 for allowing a user to control the light sources. The light sources may comprise any suitable source of light like high/low pressure gas discharge sources, laser diodes, inorganic/organic light emitting diodes, incandescent sources, or halogen sources. During operation the individually provided light output $I_{111}$, $I_{112}$, $I_{113}$, from each light source 111, 112, 113, respectively, contributes to the total light out of the illumination system for illumination of the structure 100. The illumination contributions from the various light sources 111, 112, 113 on the structure are here shown as footprints 114, 115. The footprints from the light sources may overlap. Each light source is coded such that its light output I comprises an individual identifier code ID#1-3, which is typically an embedded code emitted as a temporal sequence of modulations in the characteristics of the light emitted from the individual light source. The coded light may further comprise other information regarding the light source like current light settings and/or other information, but for sake of simplicity, only the identifier code is discussed herein to illustrate the basic idea of the inventive concept. The identifier code comprises a repeating sequence of N symbols (e.g. bits). In the following description, the symbols will be referred to as bits. However, it should be recognized that whenever the word "bit" is used in the present application, a wider definition of a "symbol" applies which may also comprise multiple bits represented by a single symbol. Examples of this are multi-level symbols, where not only 0 and 1 exist to embed date, but multiple discrete levels. The total light output of the illumination system may contain a plurality of identifier codes, each originating from the individual light source.

There are various techniques for embedding a code into the light output of a light source which are known to people skilled in the art and, therefore, are not described here in detail.

Figure 2:
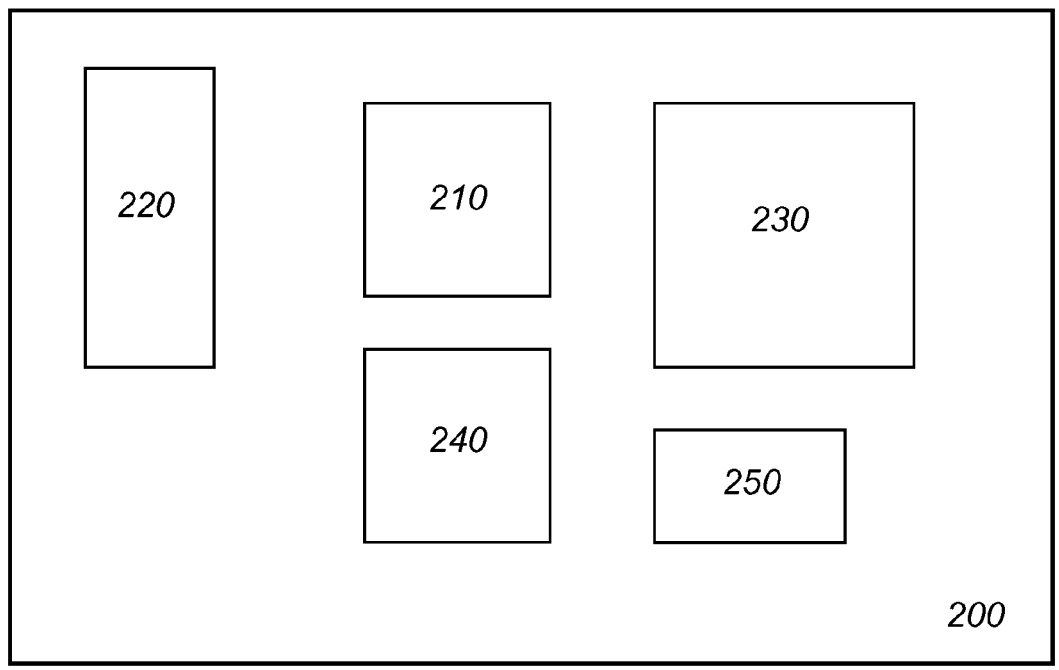
FIG. 2 is a schematic block diagram of an embodiment of a light detection system according to the present inventive concept.

To continue, the remote control 150 comprises a light detection system according to the present inventive concept, which is schematically illustrated in FIG. 2. The light detection system 200 comprises an image sensor 210 for acquiring an image of a scene, that is, in this exemplifying embodiment, an image of an area of the structure 100, towards which the remote control is pointed by the user. Further, the light detection system comprises a shutter 220 for selecting timing, exposure time and exposure area of the image sensor 210, a processing unit 230, an optionally a memory 240. The light detection system may further, optionally, comprise an optical system 250. When acquiring an image, the shutter 220 is open, and when not acquiring an image, the shutter 220 is closed. The acquired image comprises a matrix of pixels, each of which pixel represents an intensity of the total light output of the illumination system at a different physical position within the scene. The processing 230 unit is, depending on e.g. (i) the resolution of the image sensor 210 (i.e. number of pixels contained in each image/image portion), (ii) how many light sources are included in the illumination system, and (iii) whether those light sources operate synchronously or asynchronously, configured to implement different methods for processing the data contained in the acquired image (rows of the image) to determine light source identifier codes present at a particular position within the scene.

For a method implemented in the light detection system, the processing unit 230 may have access to the identifier codes or derivates of the identifier codes, i.e. parameters from which information regarding the identifier codes may be obtained.

According to an embodiment of the light detection system, the identifier code is not initially known by the light detection system. In this case, the light detection system has only knowledge of the protocol that is used to encode the messages in the coded light. In case the used protocol is not known in advance, the light detector system is arranged to be capable of recognizing the used protocol, in order to be able to decode the message in the encoded light.

Although the light detection system in this exemplifying embodiment is arranged in a remote control, it may be arranged integrated in the structure, e.g. be wall mounted, or in any other convenient manner.

The shutter 220 is in the present inventive concept of a rolling-shutter type, and may be a mechanical or electronic shutter. The rolling-shutter 220 and the image sensor 210 may be integrated, and is herein under referred to as a rolling-shutter image sensor or video camera.

Rolling-shutter image sensors are typically applied in photography, where spatial resolution requirements generally exceed those of (HD-) video. The rolling-shutter image capture follows from the line-by-line data transfer of the image sensor after the exposure of each line, while in a global shutter sensor, all pixel rows are reset and exposed simultaneously. At the end of the exposure, all rows of the global shutter sensor are simultaneously moved to a darkened area of the image sensor. The pixels are then read out row by row. Exposing all pixels simultaneously, as in a global shutter sensor has the advantage that fast-moving objects can be captured without geometric distortions. Image sensors that use the global shutter system are more complex in design that rolling-shutter sensors.

Figure 3A:
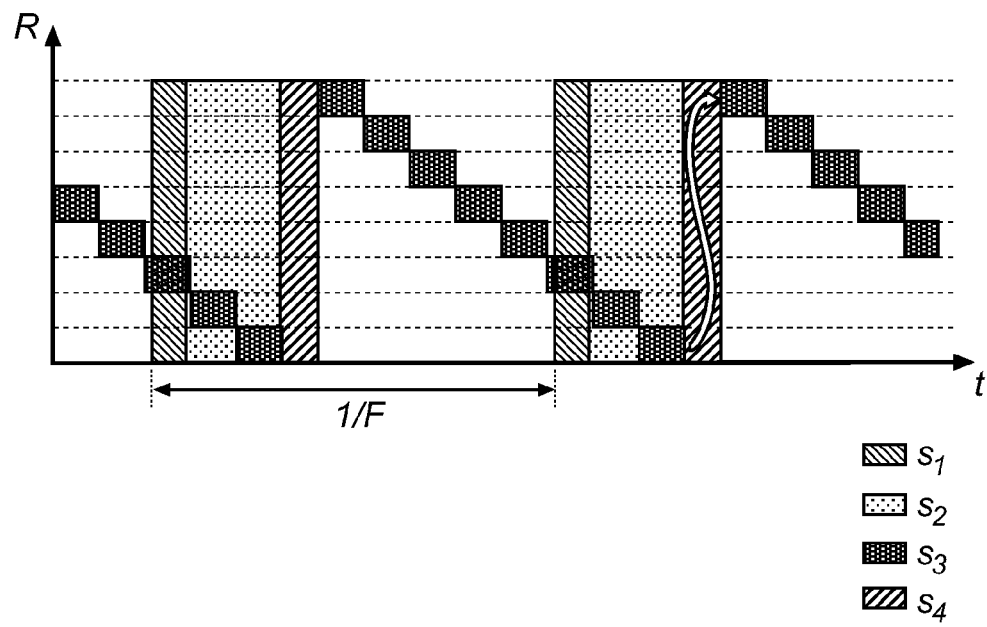
FIG. 3a is a time diagram for a typical global shutter camera during video streaming mode.
Figure 3B:
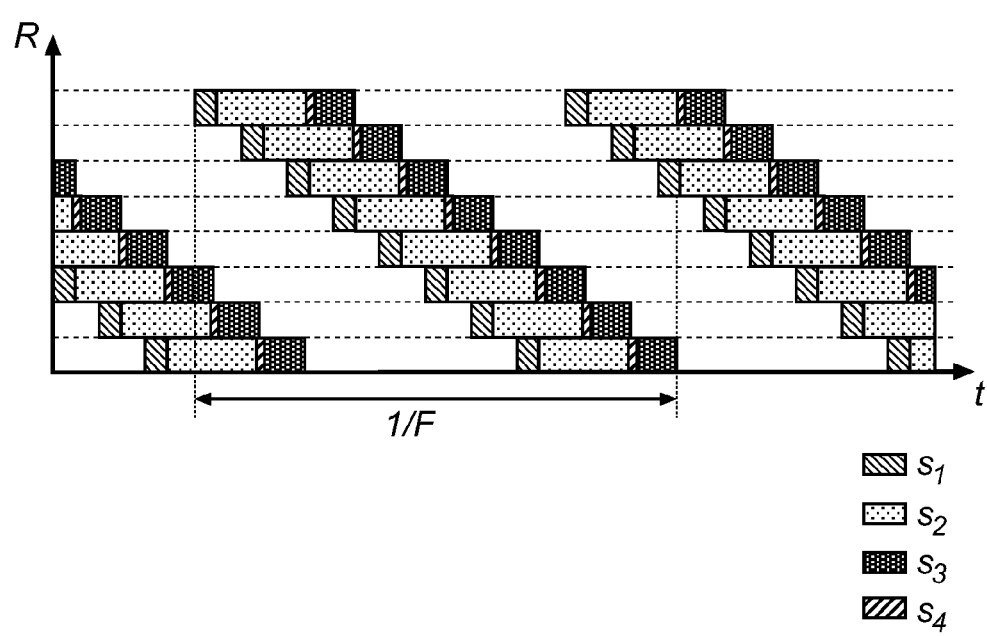
FIG. 3b is a time diagram for a typical rolling-shutter camera during video streaming mode.

To continue, FIG. 3, illustrates a time diagram for a typical global shutter system (FIG. 3a) and a typical rolling-shutter system (FIG. 3b) during video streaming mode, respectively. The pixels in the image sensor, here being a CMOS sensor in a camera, are first reset in a first step $s_1$, then exposed to the light from the scene in step $s_2$, followed by a step $s_3$ of charge transfer, and finally in the last step $s_4$ the pixels are readout. The two main principles of a global shutter system and the rolling-shutter system are illustrated.

Referring now to FIG. 3a, in a global shutter system, during a frame all pixels in all rows are first reset ($s_1$), and subsequently all rows R are exposed simultaneously ($s_2$) during an exposure time $T_e$, followed by a charge transfer (where all rows are simultaneously moved to a darkened area of the sensor) ($s_3$), and finally the pixels are then read out row by row ($s_4$) during a readout time $T_r$.

Referring now to FIG. 3b, in a rolling-shutter system, during a frame each row of pixels R is first reset ($s_1$), and subsequently exposed ($s_2$) during an exposure time $T_e$, followed by a charge transfer (where the row is moved to a darkened area of the sensor) ($s_3$), and finally read ($s_4$) during a readout time $T_r$. The rows are reset and exposed, and read out one row after another. Rolling-shutter sensors offer a higher pixel density compared to a global shutter CMOS-sensors. The sequential exposure of subsequent lines results in a time delay between exposures of adjacent rows. This causes captured images of moving objects to be distorted.

Further, in the present inventive concept an introduction of line-wise artifacts in case the illumination varies during the subsequent exposure of the rows in the rolling-shutter image sensor, is utilized to capture a high-frequent coded-light signal, which here is exemplified by the identifier code in a coded light source.

In the exemplifying embodiment of a light detection system according to the inventive concept, as described with reference to FIG. 2, the shutter 220 and image sensor 210 is a rolling-shutter image sensor, herein under referred to as a camera. The line-wise artifacts created when capturing the image of the scene is used to provide a mechanism to distinguish temporal light variations in the light output of the illumination system 100, far beyond the frame refresh frequency or the frame rate of the camera. In the exemplifying embodiment, the video frame rate is selected within a range of 25 to 60 Hz. This range provides a line readout frequency of the order of 10000 Hz to 20000 Hz. The line readout frequency determines the temporal sample rate and therefore the temporal bandwidth limit for unambiguous recovery of modulated light signals, which is provided by the Nyquist sample theorem stating that only signals up to half the sample frequency, the Nyquist frequency, can be recovered from sampled data. Here the sample frequency $f_s$ determined by the time delay between line readouts, $$f_s = \frac{1}{T_r} \tag{1}$$

A second aspect that influences the recovery of the modulated light signals is the exposure time $T_e$ of the sensor. In this paragraph we discuss three situations.
a long exposure time such that:

$$T_e > T_r \tag{2}$$

wherein large exposure times tend to deteriorate the detectability of fast light modulations, however, a smart choice of the exposure time may suppress a disturbing signal below the Nyquist frequency
an 'optimal' exposure time $$T_e = T_r \tag{3}$$

this is the optimal choice for detection of light modulations that are bandwidth-limited below the Nyquist frequency, and a short exposure time such that $$T_e < T_r \tag{4}$$

this situation provides an option to detect light modulations that exceed the Nyquist frequency.

These three possible modes of operation are elaborated in the sections below.

Figure 4:
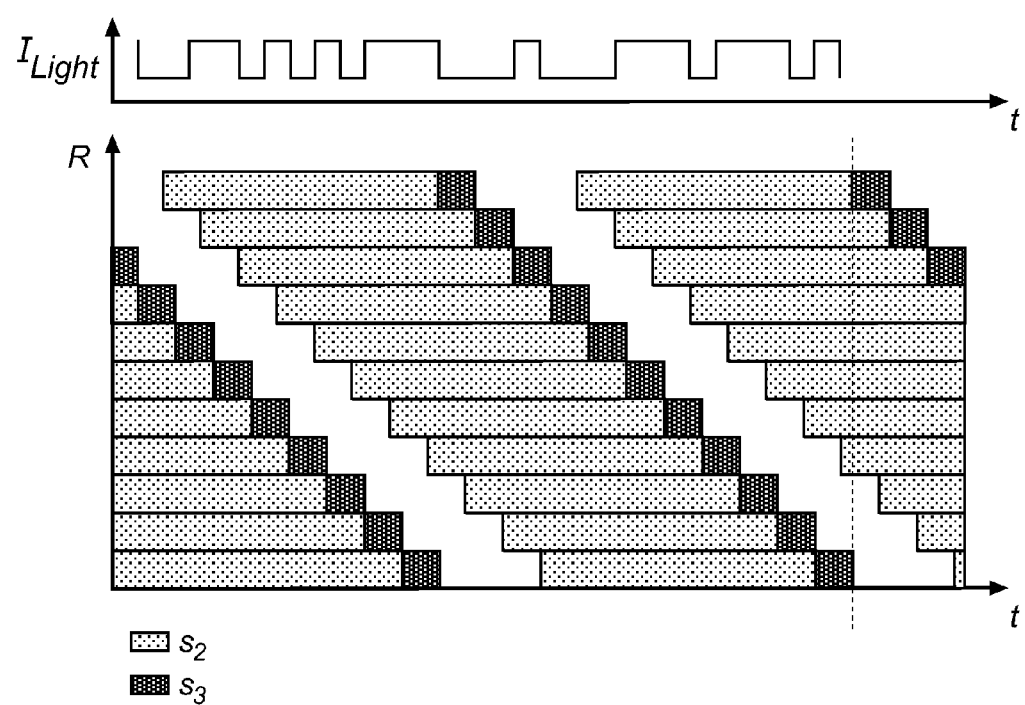
FIG. 4 is a time diagram illustrating long exposure time with respect to an average frequency of light intensity modulation as used in a light detection system according to the present inventive concept.
Figure 5:
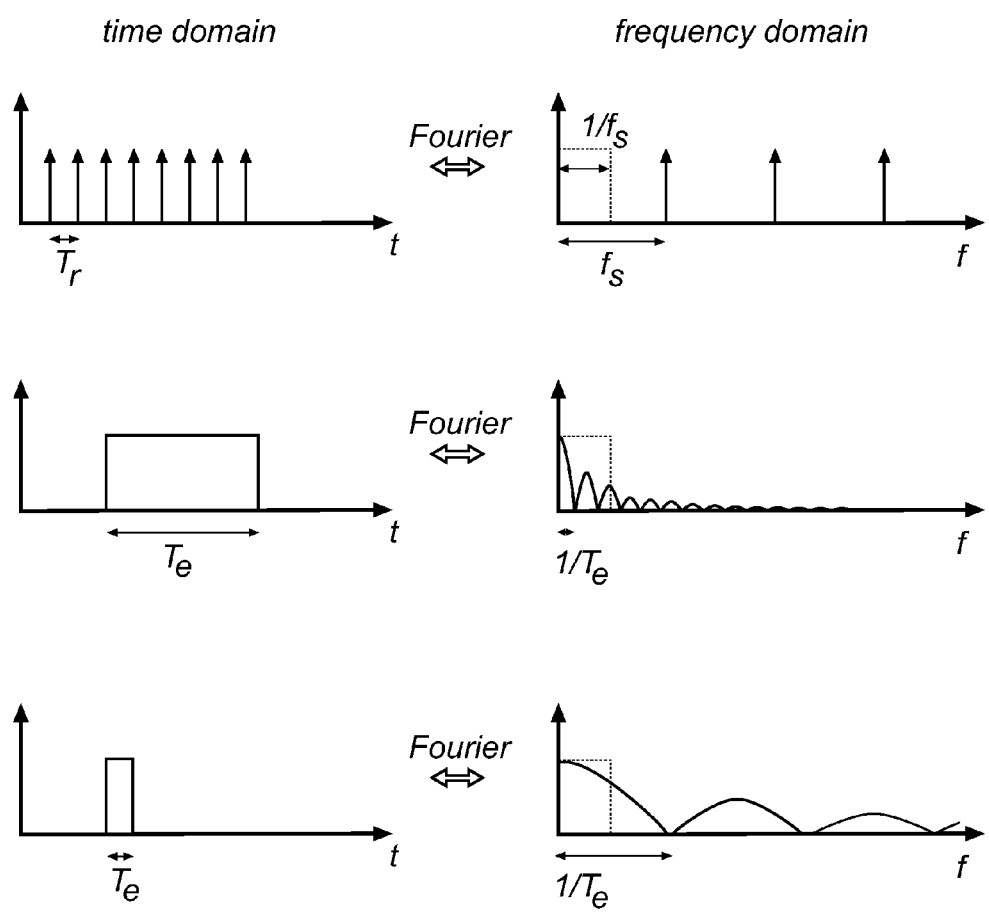
FIG. 5 illustrates signal representation in time and frequency domain after Fourier transform.

In FIG. 4, a typical situation is depicted in which the exposure time is much longer than the delay in between line readouts. For clarity, and without loss of general applicability, we neglect the reset time and charge-transfer time as depicted in FIG. 3a and FIG. 3b. The sampling process can be considered as a multiplication with a comb of equidistant Dirac functions. The exposure process can be expressed as a convolution of the modulated light signal with a rectangular filter with the temporal duration of the exposure time. In the frequency domain this causes the signal spectrum to be multiplied by a sinc-function. This is depicted in FIG. 5, which illustrates the filtering effect of different exposure-time settings given a certain time delay between consecutive lines. The left diagrams depict a signal value as a function of time, and the right diagrams depict the modulus of the Fourier transform as a function of frequency. For increasing exposure time, this filter increasingly suppresses high-frequent content of the modulated-light signal by creating zeros in frequency range up to the Nyquist-frequency and otherwise attenuating the signal amplitude. The occurrence of zeros below the Nyquist frequency can be used to suppress a disturbing signal that is present at those zero-locations in that frequency range.

Figure 6:
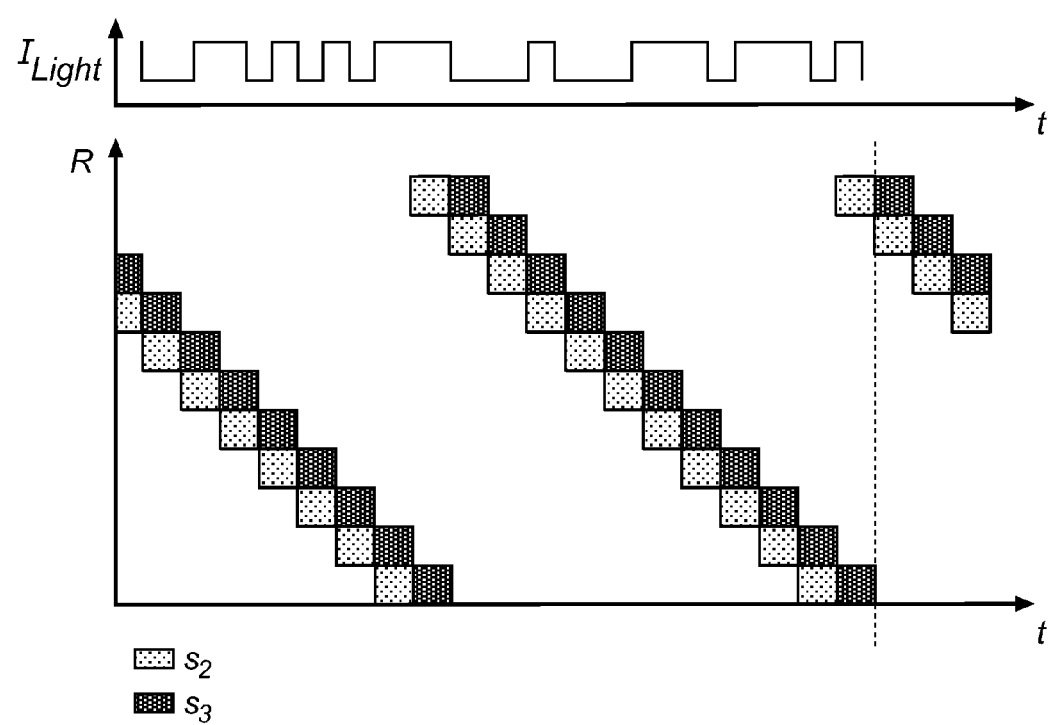
FIG. 6 is a time diagram illustrating short exposure time with respect to an average frequency of light intensity modulation as used in a light detection system according to the present inventive concept.

FIG. 6 illustrates short exposure time with respect to the frequency of the light intensity modulation. The exposure time $T_e$, during ($s_2$), is here equal to the data transfer time, i.e. the readout time $T_r$, during ($s_4$). This allows the acquisition of signals up to half the sample rate. When the exposure time is equal to the readout time, $T_e = T_r$, the first zeros of the sinc-function appear at multiples of the sample frequency. Within the fundamental frequency band up to the Nyquist frequency, the amplitude drop of the central lobe of the sinc response only causes a moderate high-frequency attenuation, which can be easily corrected.

Figure 7:
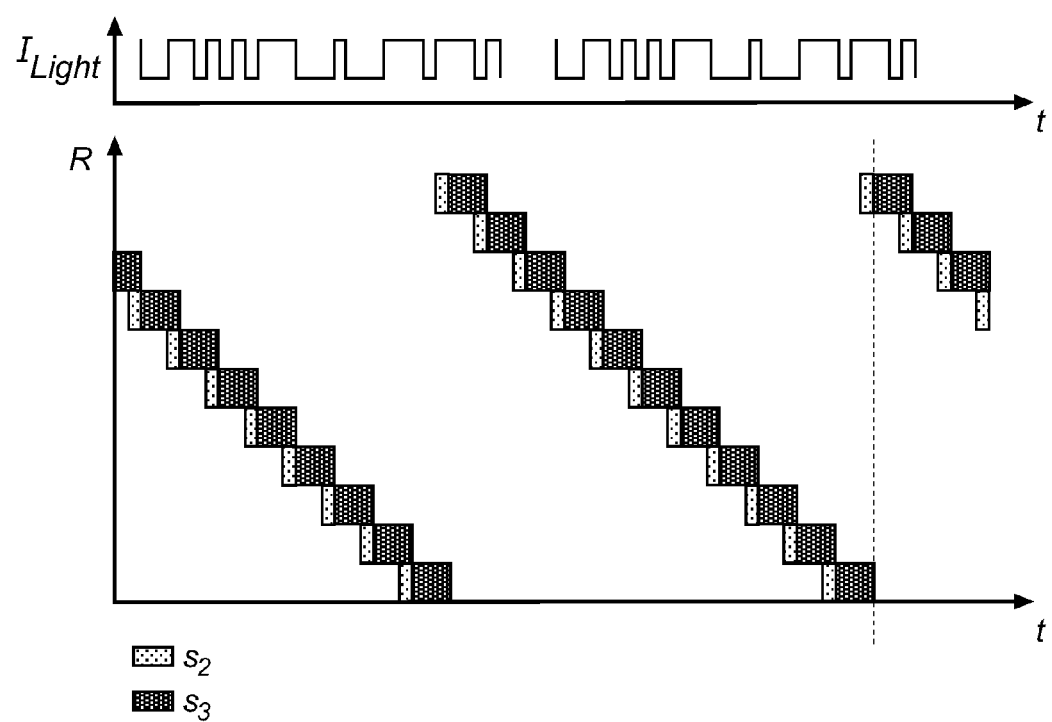
FIG. 7 is a time diagram illustrating very short exposure time with respect to an average frequency of light intensity modulation as used in a light detection system according to the present inventive concept.

FIG. 7 illustrates very short exposure time $T_e$, during ($s_2$), with respect to the frequency of the light intensity modulation. The exposure time $T_e$ is here shorter than the data transfer time, i.e. the readout time $T_r$, during ($s_4$), i.e. $T_e < T_r$. Provided that the light intensity signal is repetitive, this situation allows the detection of signals higher than half the sample rate, on the basis of aliasing. When the exposure time can be chosen shorter than the line readout delay, as depicted in FIG. 7, the attenuation of the central lobe as described above for when the exposure time is equal to the readout time, $T_e = T_r$, becomes negligible. In this situation, in absence of high-frequent attenuation, it is possible to detect high-frequent light modulation far beyond the sample frequency since the short exposure time allows detection beyond the line-rate.

Figure 8:
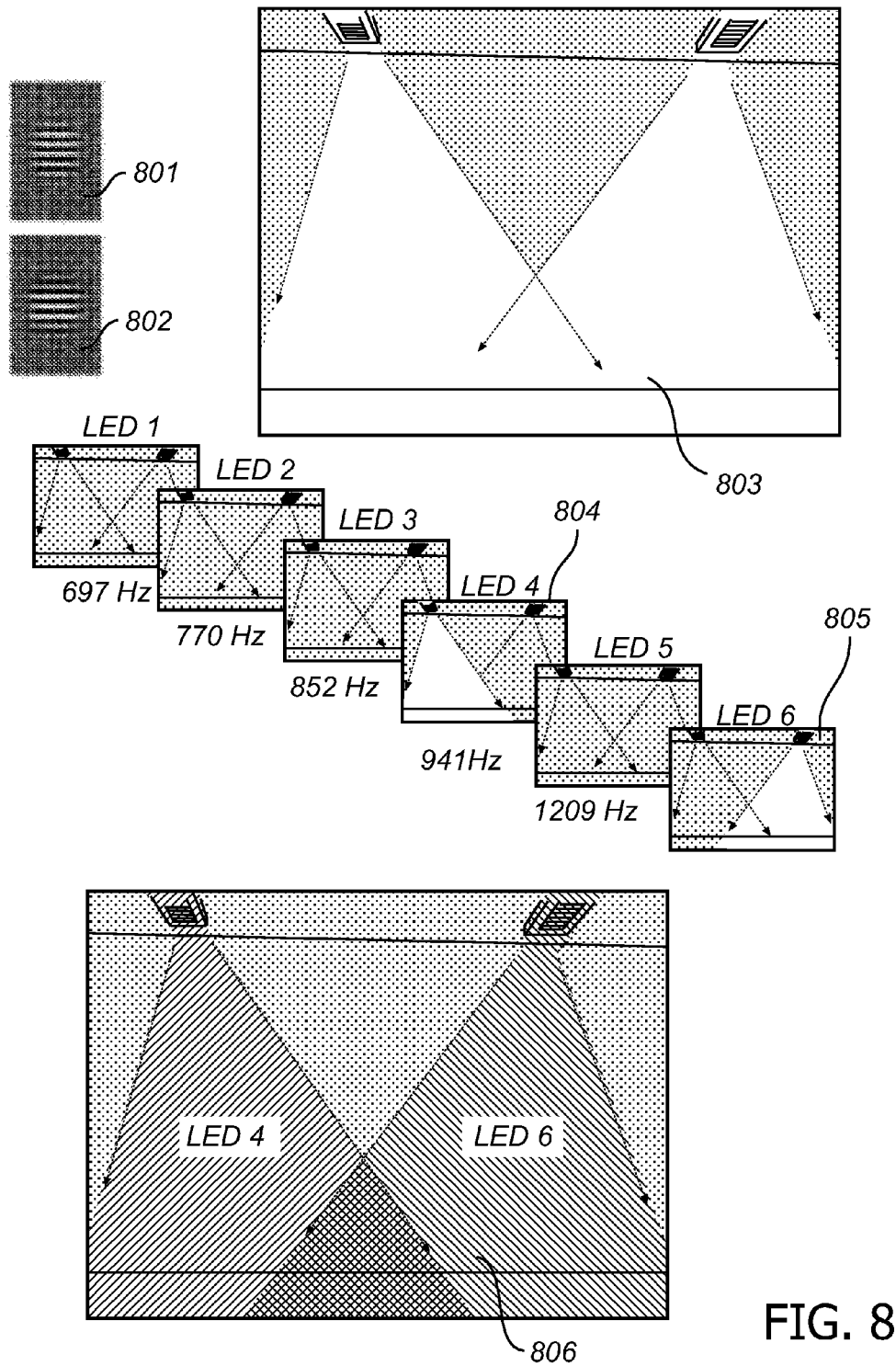
FIG. 8 illustrates the use of a filter operation of which the filter kernel matches the expected intensity pattern that is associated with a characteristic of the light-modulating signal, i.e. the embedded code.

In FIG. 8, an example is shown of the use of a filter for the selection of relevant image regions for image detection, according to an embodiment of the invention. The filter kernel used in the given example is intended to identify regions with a specific modulation frequency. The shown 2D filter kernel is based on a 1D Gabor filter of which the (complex) filter coefficients are essentially a cosine and sine function attenuated by a Gaussian window. A 1D Gabor filter is generally used for detection of isolated occurrences of a specific frequency. By extending the filter in the horizontal direction, again within a Gaussian window, we exploit the fact that the light modulation from a specific lamp causes a row-wise modulation in the image which will appear almost equally in adjacent columns. The real and imaginary components of the resulting 2D filter kernel are indicated as 801 and 802.

In the case of binary light modulation, the method can be used to detect all light sources in a scene on the basis of the presence of a specific clock signal that is embedded in the data stream. Otherwise, in the case of continuous modulation, the method can be used to detect a specific light source from a multitude of light sources, each of which is characterized by a unique modulation frequency. In the example, an input image 803, showing a scene illuminated by two different lamps, is convolved with the two kernels 801 and 802 of the complex Gabor filter, resulting in a complex valued result image of which the amplitude (the modulus) is depicted as 804. The amplitude response to another Gabor filter, characterized by another frequency corresponding to another lamp, is depicted as 805. The identification of a specific lamp follows from the comparison of the amplitude response to multiple Gabor filters, each of which designed around a different frequency. The filter with locally the highest amplitude response reveals which light source is locally contributing to the scene. The different frequency values have been chosen to avoid the occurrence of ambiguous new frequencies due to harmonic distortion by non-linear intensity transforms in the light detection, e.g. due to the gamma-correction in the camera. In the example, the frequencies have therefore been selected from the frequency series that is used as dialing tones in telephony (the so-called dual tone multiple frequency (DTMF) system. Ref: L. Schenker, "Pushbutton calling with a two-group voice-frequency code", The Bell System Technical Journal, 39(1):235-255, January 1960), i.e. separated by an incremental factor of 21/19, resulting in 697 Hz, 770 Hz, 852 Hz, 941 Hz, 1209 Hz, 1336 Hz, .... A classification result 806 shows the detected light footprints, labeled with the corresponding light source (LED 4 and LED 6, respectively).

An acquired image of a scene is captured as the rolling-shutter capture runs in a vertical direction. Therefore, the light modulation is also distributed in the vertical direction of the video frame. As a consequence, the vertical dimension of the light phenomenon in the video frame limits the temporal window with which the modulation can be observed. As the coded light is illuminating the scene, the light modulation appears both in images of the light source itself as well as in images of the illuminated scene. As long as the captured light footprint, that is the spatial localization of an individual light contribution in a scene, is sufficiently large, and sufficiently many images are recorded, the complete identifier code (or other coded message in the modulated light) can be reconstructed, provided that the identifier code is repeated periodically and each bit of the identifier code eventually appears in the captured light footprint.

According to an embodiment of the light detection system, the system further comprises an optical system (see optical system 250 in FIG. 2). The optical system, e.g. the lens of the video camera, is utilized for providing defocusing of the detected light, i.e. of the acquired image. In case the dimensions of the light source or of the illuminated footprint are impractically small, e.g. when the light source comprises a small group of light emitting diodes, LEDs, as an example four LEDs, the lens is arranged out-of-focus. As a consequence, even point-shape coded lamps will create a circular blur pattern, often referred to using the Japanese term "bokeh". When capturing an image of a point shaped light source in a scene with the lens out of focus, the light output from the point shaped light source creates a bokeh which is much larger than its dimension when focused in the image frame. At short exposure the properly focused image shows the light source as a point (actually showing its four LED elements). The out-of-focus image shows the bokeh with a line pattern due to the modulation of the light source.

According to an embodiment of the light detection system, the optical system 250 comprises an aperture mask element (not shown) for providing a pattern in the defocused detected light. The blur pattern outline is primarily determined by the size and shape of the aperture, which is generally circular. Yet, by replacing the circular aperture by an attenuating mask, each point-shaped light will adopt the pattern of the attenuating mask. This is referred to as using a coded aperture. Preferably, as in the case with the light source being a group of LEDs, the spatial shape of the aperture mask element may be selected for spatially separating light contributions originating from different light sources. As the size of the blur scales with the difference between object distance and focus distance, even small apertures can create large defocus patterns. Within the defocus pattern, the modulated light pattern remains present. A spatial shape of a coded camera aperture can be chosen to optimally separate clusters of point shaped lights, each of which is modulated with its own unique signal.

According to an embodiment of the light detections system, the shape of the point shaped light sources is altered by use of an non-isotropic optical element, e.g. a cylindrical lens, which stretches each point shape into one single dominant direction or a light-diffusing element which diffuses each point shape into a large spatial area in the captured image. When the direction of stretch is chosen in the vertical direction, the large spatial spread provides a larger temporal window showing a fragment with more code information. Other suitable optical elements may be diffusive elements, diffraction gratings and wave-front encoding lenses. The use of line-wise instances of the output light signal of an illumination system according to the present inventive concept has various advantages for signal detection, which can be used in the processing means when analyzing the image data. The horizontal spread allows the use of accumulation of multiple pixel values along an image row such that signal-to-noise ratio of the recovered signal improves and the disturbance due to inhomogeneous backgrounds can be suppressed.

In case the recovery of the normal image is desired, without the modulated-light artefacts, relatively simple operations are required to remove the disturbance, similar to the process of deinterlacing, which is commonly applied video format conversion. Deinterlacing is used to create missing image rows in an interlaced video sequence in order to create a progressive image sequence.

In the application to footprint synthesis, as mentioned in the above, image processing can isolate the different light contributions and reconstruct separate images without the modulation disturbance.

In general, there is a balance between undesired light modulation perception by humans, unwanted signal visibility in camera images and delectability with cameras. As undesired human perception generally prevails, a first set of conditions is imposed on the method and characteristics of the light modulation. In order to ensure artefact-free camera images, the modulation should be chosen to cause pixel values in each captured image to vary within the quantization step size of the pixel values, which are generally at a range from 0 to 255. Said accumulation of multiple pixels along a row is known to allow recovery of the modulating signal.

The identification of separate lamps as well as the transfer of other lamp-specific data can be based both on continuous-valued or on binary modulation schemes.

Separation of different lamps (in this context: different lamps) can be based on the assignment of different modulation frequencies, or frequency combinations, to each lamp. The repetitive nature of the modulation is that small signal fragments are sufficient for unambiguous separation of different data channels, provided that the number of different unique light source identifier codes can be relatively small. In the case that different light contributions spatially overlap on the sensor, this method can also provide sufficient orthogonality to separate the stacked signals.

Instead, in case number of different light source identifier codes is large and particularly when each light source transmits additional data that slowly changes over time (e.g. temperature, burning hours) digital data transfer is generally better suitable. In the case that different light contributions overlap, also the digital modulation method should provide sufficient orthogonality to ensure channel separation both for synchronous and asynchronous light sources.

To enable the detection by rolling-shutter cameras as well as by point-shaped detectors (e.g. photo-diodes), the combination of various modulation schemes is possible. The relative low-frequent (up to ~10 kHz) nature of the camera-based detection is typically insensitive to the high-frequent (up to ~10 MHz) modulations that can still be picked up by a photo diode. Such a hybrid light-modulation scheme allows simultaneous transmission of small data amounts to camera-based sensors and large data amounts to point-based sensors.

In the description above, the inventive concept is described with reference to, but should not be limited to, the application of low-cost cameras for the detection of coded light sources. Within the limitations of low-cost cameras as part of existing products (like smart-phones) various measures have been presented to improve detection (short exposure time, intentional defocusing). As rolling-shutter sensors continue to be more cost effective than global-shutter sensors, customized cameras may be made part of the lighting system itself, either as sensing element in a handheld device or as part of a permanent light detection system. In these cases also other measures have been presented to improve detection (coded apertures).

Above, embodiments of the light detection system according to the present invention as defined in the appended claims have been described. These should be seen as merely non-limiting examples. As understood by a skilled person, many modifications and alternative embodiments are possible within the scope of the invention.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A light detection system comprising:
    a rolling shutter camera for acquiring at least one image of a scene being illuminated by an illumination system comprising at least a first light source providing a light contribution comprising a first embedded code emitted as a temporal sequence of modulations in a characteristics of a light emitted, wherein said at least one image comprises a matrix of pixels, each pixel representing an intensity of a total light output of said illumination system at a different physical position within the scene, and wherein said at least one image is acquired as a plurality of temporal shifted line instances, each comprising an instance of said temporal sequence of modulations of the first embedded code; and
    a processing unit for determining said first embedded code from a spatial pattern of modulations, wherein said processing unit is configured for determining the first embedded code based on a combination of pixel values along each line instance, wherein said combination of pixel values along line instances is constrained to at least one predetermined subarea of said acquired at least one image, wherein a selection of said predetermined subarea is performed by convolving said at least one image with a filter having a filter kernel, which filter kernel is arranged to match an expected spatial pattern of modulations associated with said first embedded code.

2. A light detection system according to claim 1, wherein said rolling shutter camera comprises an image sensor comprising a pixel matrix of which complementary groups of pixels are readout at different time instances.

3. A light detection system according to claim 2, wherein each complementary group of pixels constitutes a row of pixels of said pixel matrix of the image sensor.

4. A light detection system according to claim 3, wherein said readout at different time instances of rows of pixels occur in a spatially monotonic order such that adjacent time instances correspond to spatially adjacent rows of pixels.

5. A light detection system according to claim 1, being arranged for detecting and analyzing an acquired image comprising contributions from a plurality of light sources, wherein each light contribution of a respective light source comprises an embedded unique code emitted as temporal sequences of modulations in a characteristics of the light emitted.

6. A light detection system according to claim 1, further comprising an optical system for providing defocusing of said acquired image.

7. A light detection system according to claim 6, wherein said optical system comprises an aperture mask element for providing a pattern in said defocused acquired image.

8. A light detection system according to claim 7, wherein a spatial shape of said aperture mask element is selected for spatially separating light contributions originating from different light sources.

9. A light detection system according to claim 1, wherein said embedded code is transmitted in a repetitive fashion, being one of a continuous repetitive data-stream, a packetized data stream, with packets at regular intervals, and a packetized data stream, with packets at irregular intervals.

10. A light detection system according to claim 1, wherein the characteristics of the light emitted is one of an intensity modulation and a color modulation.

* * * * *